US005394170A

United States Patent [19]
Akeley et al.

[11] Patent Number: 5,394,170
[45] Date of Patent: * Feb. 28, 1995

[54] APPARATUS AND METHOD FOR CONTROLLING STORAGE OF DISPLAY INFORMATION IN A COMPUTER SYSTEM

[75] Inventors: Kurt Akeley, Union city; James Foran, Milpitas, both of Calif.

[73] Assignee: Silicon Graphics, Inc., Mountain View, Calif.

[*] Notice: The portion of the term of this patent subsequent to Nov. 30, 2010 has been disclaimed.

[21] Appl. No.: 990,750

[22] Filed: Dec. 15, 1992

Related U.S. Application Data

[63] Continuation of Ser. No. 657,086, Feb. 15, 1991, Pat. No. 5,266,941.

[51] Int. Cl.6 .............................. G09G 1/16
[52] U.S. Cl. ........................ 345/189; 345/133; 345/201
[58] Field of Search ............ 340/798, 799, 802, 803, 340/747, 750, 734, 721; 395/164, 165, 166, 133, 134, 135, 141; 345/113, 114, 133, 189, 190, 115, 198, 201, 200, 134, 135, 191; 358/183; 348/584, 585, 508

[56] References Cited

U.S. PATENT DOCUMENTS

| | | | |
|---|---|---|---|
| 4,425,559 | 1/1984 | Sherman | 340/747 |
| 4,491,836 | 1/1985 | Collmeyer et al. | 340/747 |
| 4,725,831 | 2/1988 | Coleman | 340/747 |
| 4,763,119 | 8/1988 | Matsubara et al. | 340/747 |
| 4,816,814 | 3/1989 | Lumelsky | 340/747 |
| 4,849,745 | 7/1989 | Satou | 340/723 |
| 4,906,986 | 3/1990 | Takeda | 340/799 |
| 4,943,801 | 7/1990 | Oguchi | 340/723 |
| 4,951,232 | 8/1990 | Hannah | 364/522 |
| 4,979,130 | 12/1990 | Li et al. | 364/518 |
| 5,031,114 | 7/1991 | Yamagami | 364/518 |
| 5,266,941 | 11/1993 | Akeley et al. | 345/201 |

*Primary Examiner*—Alvin E. Oberley
*Assistant Examiner*—Steven J. Saras
*Attorney, Agent, or Firm*—Blakely, Sokoloff, Taylor & Zafman

[57] ABSTRACT

A method and apparatus for controlling the storage of display information into a frame buffer is disclosed. A memory means is provided for storing information for controlling the storage of display information into the frame buffer where the memory means contains a plurality of locations each of which corresponds to and controls the storing of display information in one location of the frame buffer. A pass/fail ALU is coupled to the memory means to obtain a value for a particular pixel; this ALU provides a signal indicative of one of a first or second state which state indicates whether storage of display information to the frame buffer will occur. A first function is stored in a register, which function specifies the first signal. A first storage register and a second storage register store a second function and a third function respectively and provide a second value and a third respectively. The second value or third value is stored as a new value in the first memory for said first pixel location depending upon the state indicated by tile first signal. An application of the method and device of the invention includes a method for generating hollow polygons having an interior region and a perimeter in said frame buffer for display on said display device.

15 Claims, 6 Drawing Sheets

APPARATUS AND METHOD FOR CONTROLLING STORAGE OF DISPLAY INFORMATION IN A COMPUTER SYSTEM

This is a continuation of application Ser. No. 07/657,086, filed Feb. 15, 1991, now U.S. Pat. No. 5,266,941.

BACKGROUND OF THE INVENTION

The invention relates to a computer controlled graphics display system and more particularly to a computer controlled display system for presenting images to an observer/user on a display device, such as a CRT where the images am stored in a buffer.

DESCRIPTION OF THE PRIOR ART

Prior art computer controlled graphics display systems, including those implemented on engineering workstations, typically include a frame buffer memory which is dedicated to providing a bit mapped memory for refreshing a display device such as a CRT. Each picture element ("pixel") on the CRT is lit up or colored in a manner dependent upon the display information which is stored in the frame buffer at a memory location which is dedicated to that particular pixel. Typically, each pixel is specified by a plurality of bits such as, for an example, 16 bits of digital information which could specify up to 65,536 different colors or gray scales of varying intensities. High performance workstations may also include a Z buffer which is used to implement a hidden surface algorithm using Z values. This permits a computer controlled display device to present a 3-D dimensional representation of an image by using the Z buffer which contains the information that indicates whether one object on the screen of the display is, in front of or behind another object.

Conventional computer controlled graphics display systems typically also include, as part of the graphics subsystem, a graphics update controller which controls the updating of the frame buffer and the Z buffer and also controls refreshing of those buffers and of the display device such as a conventional video monitor or liquid crystal display device. Examples of prior art graphics update controllers can be found in U.S. Pat. No. 4,951,232 of Marc R. Hannah; in particular, FIGS. 1 and 2 of this patent show prior art graphics update controllers which receive the graphics data from a main CPU and then update the frame buffer and Z buffer according to the hidden surface algorithm and interpolation algorithms.

The Z buffer and its associated hidden surface algorithm provides a technique for producing a 3-dimensional representation of an image in a computer controlled graphics display system but it fails to provide the capability to control the writing of pixels in a programmable manner and in a manner which provides numerous tools to control the writing of display information into the frame buffer. It is an object of the present invention to provide an apparatus and method for controlling the writing of display information in a programmable manner. It is also an object of the present invention to provide applications for this method and apparatus, such as the generation of hollow polygons using the method and apparatus of the present invention.

SUMMARY OF THE INVENTION

A computer controlled graphics display system is disclosed which includes a frame buffer memory means for storing display information and further includes a stencil buffer memory means for storing information for controlling the storage of the display information in the frame buffer memory means. The frame buffer memory means will contain a plurality of storage locations, each of which provides information to a single picture element (pixel) on a display device, such as a raster scanned CRT or liquid crystal display device. The stencil buffer memory means will also contain a plurality of storage locations each of which corresponds to and controls the storing of display information in one location in the frame buffer. The apparatus of the present invention further includes logic means, such as a stencil pass/fail ALU which is coupled to the stencil memory buffer to obtain a stencil value for a particular pixel. The logic means typically includes a mechanism for providing a first signal which is indicative of either a stencil pass state or a stencil fail state. The logic means may further include means for storing a specified function, which function, in conjunction with the stencil value for a particular pixel, determines the state of the first signal for that pixel. The apparatus of the present invention further includes a first storage means, such as a pass storage register, which specifies a pass function or flag and which is coupled to the stencil buffer to obtain the "old" stencil value. A means for providing a new stencil value which is determined by the old stencil value and the pass flag or function is associated with or included with this storage means. This new (pass) stencil value will be selected in the circumstance where the stencil test passes and this value will be stored as the new stencil value in the stencil buffer in this circumstance.

The device of the invention further includes a second storage means for storing and specifying a fail function or flag, which function or flag is representative of the function which should be performed to obtain a new stencil value should the stencil test fail. This storage means is coupled to the stencil buffer to obtain the old stencil value, and this storage means is typically associated with means for providing a stencil fail value which is determined by the old stencil value and by the fail function. Typically, this fail function, together with the old stencil value, will specify the new value for the stencil for the current pixel location should the stencil test fail.

The device of the present invention further includes a selector means for selecting between the pass and fail stencil values based upon the signal generated by the logic means (stencil pass/fail ALU). The selector means is coupled to the logic means and is also typically coupled to the first and second storage means. The selector means is also coupled to the stencil memory buffer to provide the new stencil value. Alternatively, if the signal generated by the stencil pass/fail ALU is the other (fail) state, the fail stencil value will be provided to the stencil buffer for storage.

The device of the present invention further includes a frame buffer update control means which is coupled to receive the signal from the stencil pass/fail ALU and is also coupled to the frame buffer to control writing of the display information into the frame buffer.

Typically, numerous different functions may be used to determine whether a stencil passes or fails, and similarly numerous different functions may be specified for the pass function and the fail function which determine the new stencil values in both the stencil pass case and the stencil fail case respectively. The device of the present invention may further include apparatus for storing a function which indicates the new stencil value if the stencil test passes and the Z comparison test also passes.

The method of the present invention operates on a computer controlled graphics display system having a display device and a frame buffer for storing digital display information and further includes a stencil buffer for storing stencil values. The method of the present invention includes the steps of obtaining an old stencil value from the stencil memory means from one of the locations in the stencil buffer which location corresponds to the current pixel being updated.

The method further includes the steps of specifying a first function which is used to perform the stencil pass/fail test and then computing the value of the first function based upon the old stencil value and a reference value to determine whether the stencil test has passed or failed. The method further includes providing a second function ("pass" function) which will determine, in conjunction with the old stencil value, the new stencil value should the stencil test pass. This second function is computed to determine the new stencil value should the stencil test pass. The method further includes specifying a third function, which is used to determine the new stencil value, based upon the old stencil value, should the stencil test fail. This third function ("fail" function) is computed and then the method of the present invention selects between the value produced by the second function (pass function) and the value produced by the third function (fail function). The method of the invention then stores the selected value in the stencil buffer and then determines whether or not to update the frame buffer based upon whether the stencil test passed or failed. If the stencil test passed, then the new color or gray scale values will be written into the frame buffer location corresponding to the current pixel location which has been evaluated.

The present invention further includes applications of the method and device of the invention, such as a method for generating hollow polygons. This method is practiced in a computer controlled graphics display apparatus having the device of the invention, along with a writemask means which can enable or disable writing of display information into the frame buffer memory and the Z buffer memory. The method of generating the hollow polygon includes the step of setting the writemask to disable writing to the frame and Z buffers, and then clearing all stencils to zero for each pixel location in the stencil buffer. Then, all stencil values which have associated pixels within or on the perimeter of the polygon are set to a value equal to 1 while the writemask continues to disable writing (storing) to the frame buffer. Then the method determines those pixels which are on the perimeter of the polygon by redrawing the polygon four times, each time shifted, from the original location, one pixel up, one pixel down, one pixel to the left, and one pixel to the right (the order of the shifting does not matter). Each time the polygon is redrawn in its shifted position the stencil values are modified by incrementing by one any stencil having a value greater than zero. Each time the polygon is "drawn" the writemask disables frame and Z buffer writing so that the frame buffer does not cause the display of the polygon being redrawn in shifted locations.

After redrawing the polygon four times, those stencil values which have their associated pixels on the perimeter will have values within a certain range (for example, values between one and four) and all other pixels not on the perimeter will have stencil values which are not within that range, making it easy to select those pixels for writing which are on the perimeter of the polygon. Specifically, after redrawing the polygon four times, the method forces interior and exterior pixels (with respect to the polygon) to have the same stencil value (e.g. zero). This is done by drawing the polygon (while the writemask disables writing to the frame buffer) while the stencil test has been set up to force stencil values outside of the known range to the value of zero. The method then enables writing to the frame buffer and then draws the polygon in the original location with the stencil logic set to allow storing to the frame buffer when the stencil value is within the known range (e.g. values between one and four). The method of the invention also clears all stencils at this time in order to reinitialize the stencil buffer for further operations.

BRIEF DESCRIPTION OF THE DRAWINGS

FIG. 1b shows a single location corresponding to a particular pixel location on the display device in the memory architecture shown in FIG. 1a.

DETAILED DESCRIPTION OF THE INVENTION

Figure 1A:
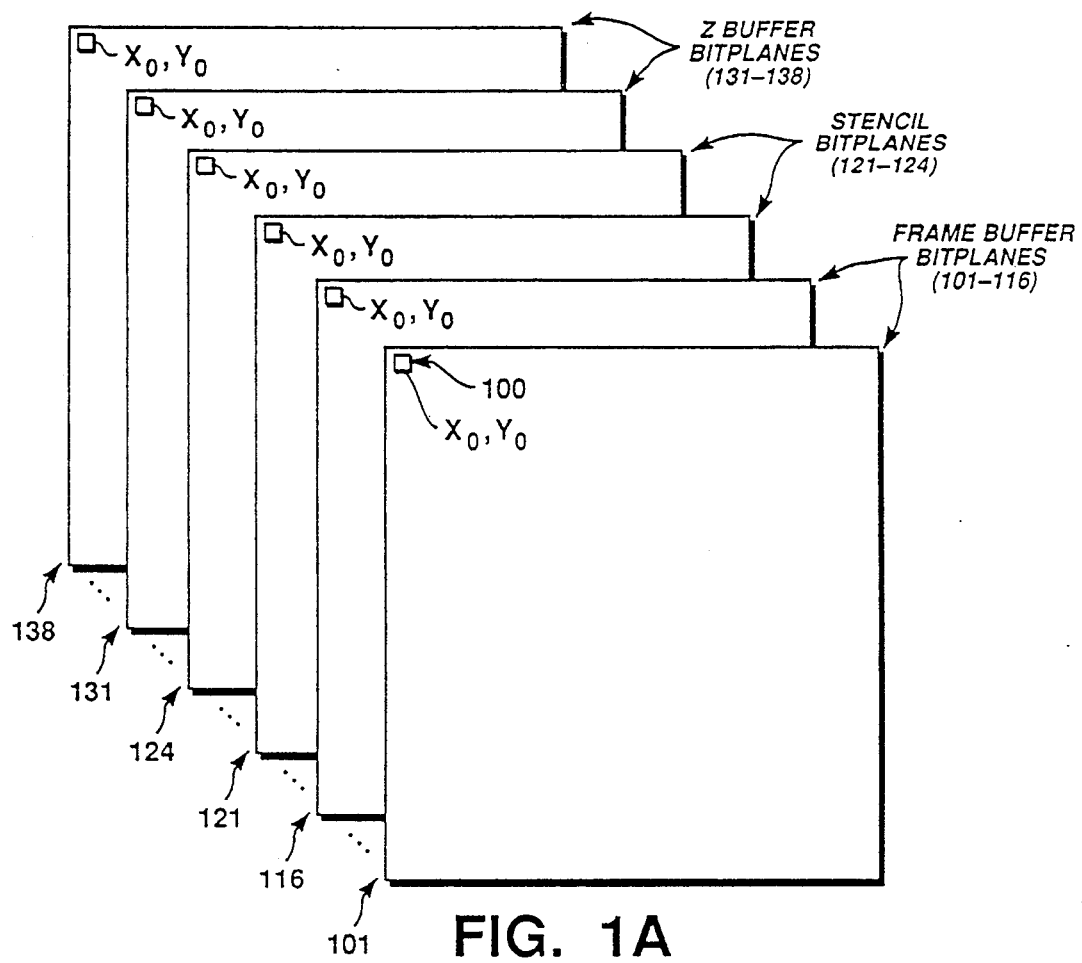
FIG. 1a shows an example of a memory architecture of the present invention.

The subject invention will be described with reference to numerous details set forth below and the accompanying drawings which illustrate the invention. The following description is illustrative of the invention and is not to be construed as limiting the invention. Numerous specific details are described to provide a thorough understanding of the present invention. However, in other instances, certain well known or conventional details are not described in order to not unnecessarily obscure the present invention in detail. In the drawings, the same element is labeled with the same reference numeral.

FIG. 1a shows the memory architecture in a computer controlled graphics display system of the present invention. This architecture is similar to the architectures found in systems of the prior art except that the stencil bit planes 121 through 124 will not be found in such prior art systems. As shown in FIG. 1a, the pixel (picture element) 100 is at a particular location on a display device which has been shown as location $X_0$, $Y_0$. It will be understood that this pixel location will have associated color or gray scale values in the frame buffer bit planes and will further have a stencil value at the corresponding location in the stencil bit planes 121 through 124. The Z value for this pixel location will be obtained from the Z buffer bit planes 131 through 138 at the memory address location in the Z buffer which corresponds to the pixel at location $X_0, Y_0$.

Figure 1B:
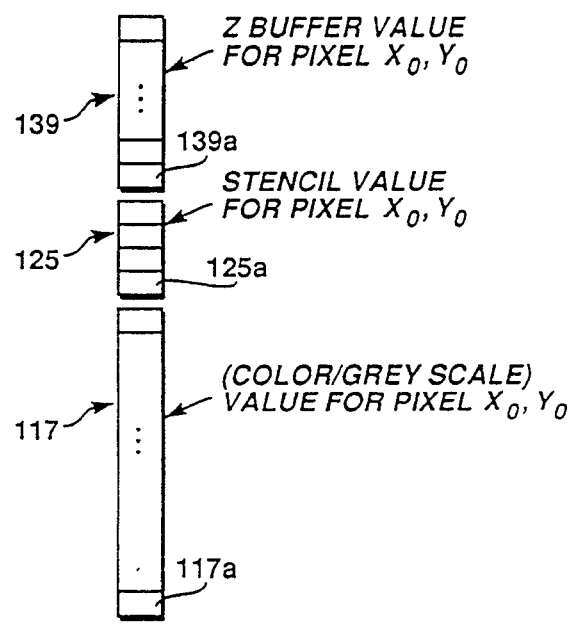
Figure 2A:
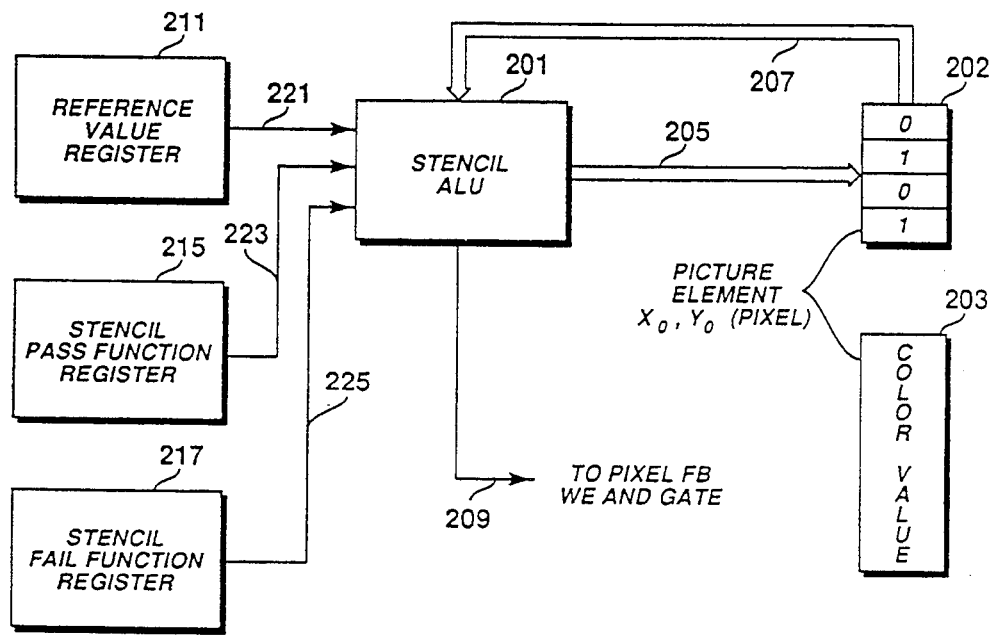
FIG. 2a shows an example of the device of the present invention.

FIG. 1b shows the complete "word" for the pixel at location $X_0, Y_0$. At that location, the color or gray scale is specified by the 16 bit value stored in the memory slice 117 of the 16 frame buffer bit planes 101 through 116. Position 117a may be thought of as representing the least significant bit of the 16 bit value (or conversely the most significant bit). The slice 125 shown in FIG. 1b contains the 4 bit stencil value for the pixel $X_0, Y_0$, and the position 125a *may be considered to be the least significant bit of the stencil value*. Similarly, *the slice 139 contains the* 8 bit Z value for the pixel at location $X_0, Y_0$. One embodiment of the device of the present invention will now be described with reference to FIG. 2a. The stencil logic of the invention includes a stencil ALU 201 which performs several functions which are described below. The device also includes a reference value register 211 and a stencil pass function register 215 as well as a stencil fail function register 217. The reference value register 211 is coupled to the stencil ALU 201 by bus 221. The stencil pass function register 215 is coupled to the stencil ALU 201 by the bus 223, and the stencil fail function register 217 is coupled to the stencil ALU 201 by the bus 225. The stencil ALU 201 receives an input indicating the old S (stencil) value from bus 207, and the stencil ALU 201 provides the new stencil value over bus 205 which is then stored in the stencil buffer at the current memory location which is associated with the pixel which is currently being processed. As shown in FIG. 2a, the pixel currently being processed is at location $X_0, Y_0$ and the old stencil value (having a decimal value equal to 5—reading up) is stored in the memory location of the stencil buffer which has been labeled 202. The stencil ALU 201 provides a signal on line 209 which indicates whether the stencil test has passed or failed. This signal is used to control writing of the color or gray scale value to the frame buffer (FB). In a typical embodiment, this signal will be an input to an AND gate which has as its other input the conventional write enable (WE) control signals for the memory chips in the frame buffer memory.

Prior to operating the stencil logic of the present invention, the user will typically specify a reference value which is stored in register 211 and will specify two functions or flags which are stored in register 215 and register 217 respectively. In particular, the user will typically specify a function to be stored in the pass function register 215, which function will determine the new stencil value should the stencil test, performed by the stencil ALU, result in a stencil pass state. Similarly, the user will specify and store a function or flag in the fail function register 217, which function or flag will determine the new stencil value should the stencil test fail. The stencil ALU 201 will typically include a stencil pass/fail function which will determine the result of the stencil pass/fail test; that is, this function will indicate whether, for the currently processed pixel location, the stencil state should be a pass state or a fail state. If the stencil passes then writing to the frame buffer will be allowed by providing a signal on line 209 which enables writing to the frame buffer. On the other hand, if the stencil function determines that the stencil state is a fail state then writing to the frame buffer will be disabled by not providing the proper signal on line 209. The stencil pass/fail function may take as its input or variables the reference value stored in the register 211 as well as the old stencil value which was retrieved from the stencil buffer via bus 207.

The stencil ALU 201 is typically programmable in the sense that different stencil pass/fail functions may be executed by the ALU 201. For example, the stencil ALU 201 may be set to execute one of the following eight functions:

TABLE 1

| | |
|---|---|
| SF_NEVER | Never pass. |
| SF_LESS | Pass if reference value is less than old stencil value. |
| SF_LEQUAL | Pass if reference value is less than or equal to old stencil value. |
| SF_EQUAL | Pass if reference value is equal to old stencil value. |
| SF_GREATER | Pass if reference value is greater than old stencil value. |
| SF_GEQUAL | Pass if reference value is greater than or equal to old stencil value. |
| SF_NOTEQUAL | Pass if reference value is not equal to old stencil value. |
| SF_ALWAYS | Always pass. |

Similarly, several different alternative flags or functions may be specified by the user in the pass function register 215 and the fail function register 217. For example, one of the six following flags may be stored in each of these registers:

TABLE 2

| | |
|---|---|
| ST_KEEP | Keep the current stencil value (no change). |
| ST_ZERO | Replace stencil value with zero. |
| ST_REPLACE | Replace stencil value with the reference value. |
| ST_INCR | Increment stencil value by one (clamp to max). |
| ST_DECR | Decrement stencil value by one (clamp to zero). |
| ST_INVERT | Invert all bits in stencil value. |

It will be appreciated that stencil ALU 201 may be a simple programmable microprocessor or other processing logic which can read the registers 211, 215 and 217 as well as the old stencil value 207 to thereby determine the new stencil value which is output to the stencil buffer via bus 205. It should also be appreciated that numerous alternative implementations are possible, such as one employing a single processor, such as the main CPU of the computer to execute the method of the invention in software. In this embodiment, the reference value and the pass and fail flags would typically be stored in the general memory space of the computer system. It should also be appreciated that numerous variations for the stencil pass/fail function tests function as well as numerous variations for the flags stored in registers 215 and 217 are possible. While a 4 bit stencil value is shown in FIG. 2a, larger bit or smaller bit stencil values may also be employed according to the present invention. It should be noted that no Z buffer is used in the embodiment shown in FIG. 2a as none is required.

Figure 2B:
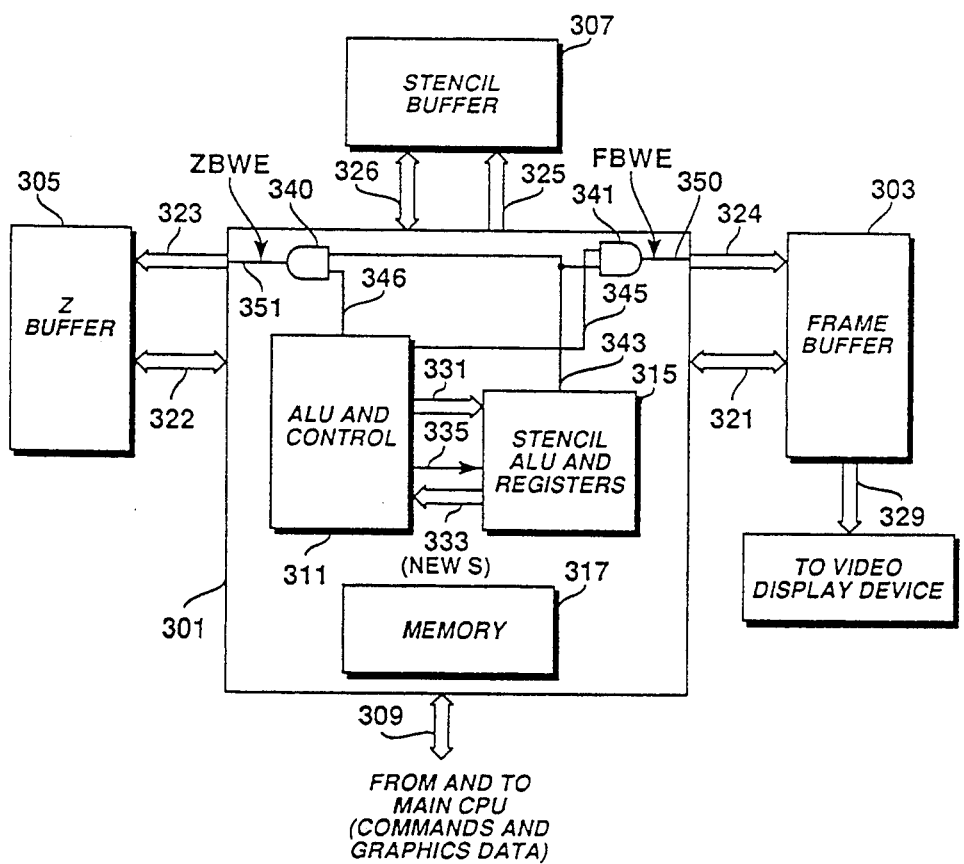
FIG. 2b is the schematic diagram of the architecture of a graphics update controller which includes a device of the present invention.

In order to provide an overview of the use of the device and method of the present invention in a graphics display system, reference will now be made to FIG. 2b for the following discussion. The graphics update controller 301 is coupled to receive commands and graphics data from the main CPU or host system via bus 309, which commands and graphics data are then used by the ALU and control unit 311 to update the Z buffer 305 in the conventional manner and similarly to update the frame buffer 303 in the conventional manner according to the hidden surface algorithm. The details of the operation of a graphics update controller are well known; for example, see U.S. Pat. No. 4,951,232 of Marc R. Hannah, which describes the operation and structure of a graphics update controller (see FIG. 2 thereof) which is similar to the graphics update controller 301 in FIG. 2b of the present invention. The differences between the graphics update controller 301 in FIG. 2b and the graphics update controller of FIG. 2 in U.S. Pat. No. 4,951,232 will be noted after describing the components of the graphics update controller 301. The controller 301 is coupled to the frame buffer 303 via a data bus 321 and an address and control bus 324. The controller 301 is coupled to the Z buffer 305 via a data bus 322 and via address and control bus 323. As can be seen from FIG. 2b, the data buses 321 and 322 are bidirectional. The frame buffer 303 is coupled to the video display device (through conventional digital to analog and other controlling circuitry) via bus 329. The stencil buffer 307 is coupled to the controller 301 via a data bus 326 an address and control bus 325; the stencil buffer 307 represents an additional memory buffer, which is similar to the Z buffer and which is updated and refreshed using conventional memory control circuitry by the ALU and control unit 311. It should be noted that while the stencil buffer is shown separate from the Z buffer, it could be a separately addressable part of the Z buffer, thereby allowing simultaneous reading of the old Z value and the old stencil value for a particular memory location corresponding to the currently processed pixel location. As with prior art graphics update controllers, the graphics update controller 301 uses conventional, well known memory refresh and video refresh techniques to refresh the Z buffer and the frame buffer (if they are dynamic random access devices) and to refresh the video display device respectively. As shown in FIG. 2b, the frame buffer 303 is implemented using memory devices which have dual ports in order to permit writing of data into one port and to read out data (display information) to the video display device through another port. The memory 317 provides a scratch pad memory to receive values and hold them for the ALU and control unit 311 and may also contain program storage for operating the ALU and control unit 311. Thus, for example the commands and graphics data from the main CPU may be temporarily stored in memory 317 while the ALU in control unit 311 is busy executing other operations.

The graphics update controller 301 is similar to the controller shown in U.S. Pat. No. 4,951,232 except that the stencil device of the present invention has been added to the controller resulting in the conditional writing to the Z buffer and frame buffer under the control of the output signal on line 343 from the stencil ALU and registers 315; in other words, in the prior art graphics update controllers, the write enable control signals from ALU and control unit 311, which signals are present on lines 346 and 345 (for the Z buffer and the frame buffer respectively) would be directly connected to lines 351 and 350 respectively rather than through the AND gates 340 and 341. Other differences between the prior art graphics update controller and the update controller 301 include the presence of stencil ALU and registers 315 as well as the bus 331 which provides the old stencil value to the stencil ALU 315 and the bus 333 which provides the new stencil value from the stencil ALU 315 to the ALU and control unit 311 for storage in the stencil buffer 307. Another difference is the Z comparison test line 335 which provides the logical result of the Z comparison test performed in the ALU and control unit 31 0 to the stencil ALU and registers 315.

The overall operation of the graphics update controller 301 will be briefly described before discussing in detail the stencil ALU 315. The controller 301 typically receives the graphics data, which includes new pixel values and new Z values, for each scan line across the video display apparatus from the main CPU via bus 309. Alternatively, the controller 301 may receive graphics data for a scan line in a form which does not include pixel by pixel values but rather pixel starting and ending and Z starting and ending values as described in U.S. Pat. No. 4,951,232 (see column 3, lines 42 through column 4, line 63). In this well known circumstance, the update controller 301 will calculate new pixel values and new Z values (between the starting and ending values) rather than actually receiving them from the main CPU. Each pixel location already displayed on the display device will have an old Z value and an old pixel value which are stored respectively in the Z buffer and the frame buffer. For each pixel location, the graphics update controller 301 will perform the following operations. First the graphics update controller 301 reads the old Z value in the Z buffer which corresponds to the current pixel location which is being or has been computed. Contemporaneously, the controller 301 reads the old stencil value from the stencil buffer 307 via data bus 326 by supplying the proper address for the current pixel location over address and control bus 325 to the stencil buffer 307. The ALU and control unit 311 performs the Z test comparison and provides the old stencil value via bus 331 to the stencil ALU and register 315. The result of the Z comparison test is outputted to the stencil ALU in registers 315 but updating (writing) to the frame buffer and Z buffer does not yet occur since it is conditioned upon the state of the stencil pass/fail test. The state of the stencil pass/fail test is then determined, typically based upon the old stencil value and the reference value and the result of this test will then determine the value of the new stencil which is to be stored in the current pixel location in stencil buffer 307. If the stencil test passed, then writing of the new pixel value and the new Z value will be enabled via gates 340 and 341 by providing the enabled signal over line 343 to the AND gates 340 and 341. The ALU and control unit 311 provides the proper addresses to the Z buffer and the frame buffer over address and control buses 323 and 324 while the Z buffer write enable (ZBWE) and the frame buffer write enable (FBWE) are active and then the new Z value and new pixel value are supplied to the Z buffer and frame buffer via the data buses 322 and 321 respectively. Similarly, the ALU and control unit 311 provides the new stencil value for the current pixel location to the stencil buffer 307 via the data bus 326 by providing the proper address location to that buffer over address and control bus 325. It will be appreciated that the write enable lines 346 and 345 provide the conventional write enable signals from the ALU and control unit 311 and these lines may each be multibit buses for several banks of memory. Following the determination of writing or not writing to the Z buffer and frame buffer, the update controller 301 moves to the next pixel location along the scan line to perform the same operations for that pixel location. This operation is repeated for each pixel along the scan line and for each of the scan lines on the display device.

Figure 2C:
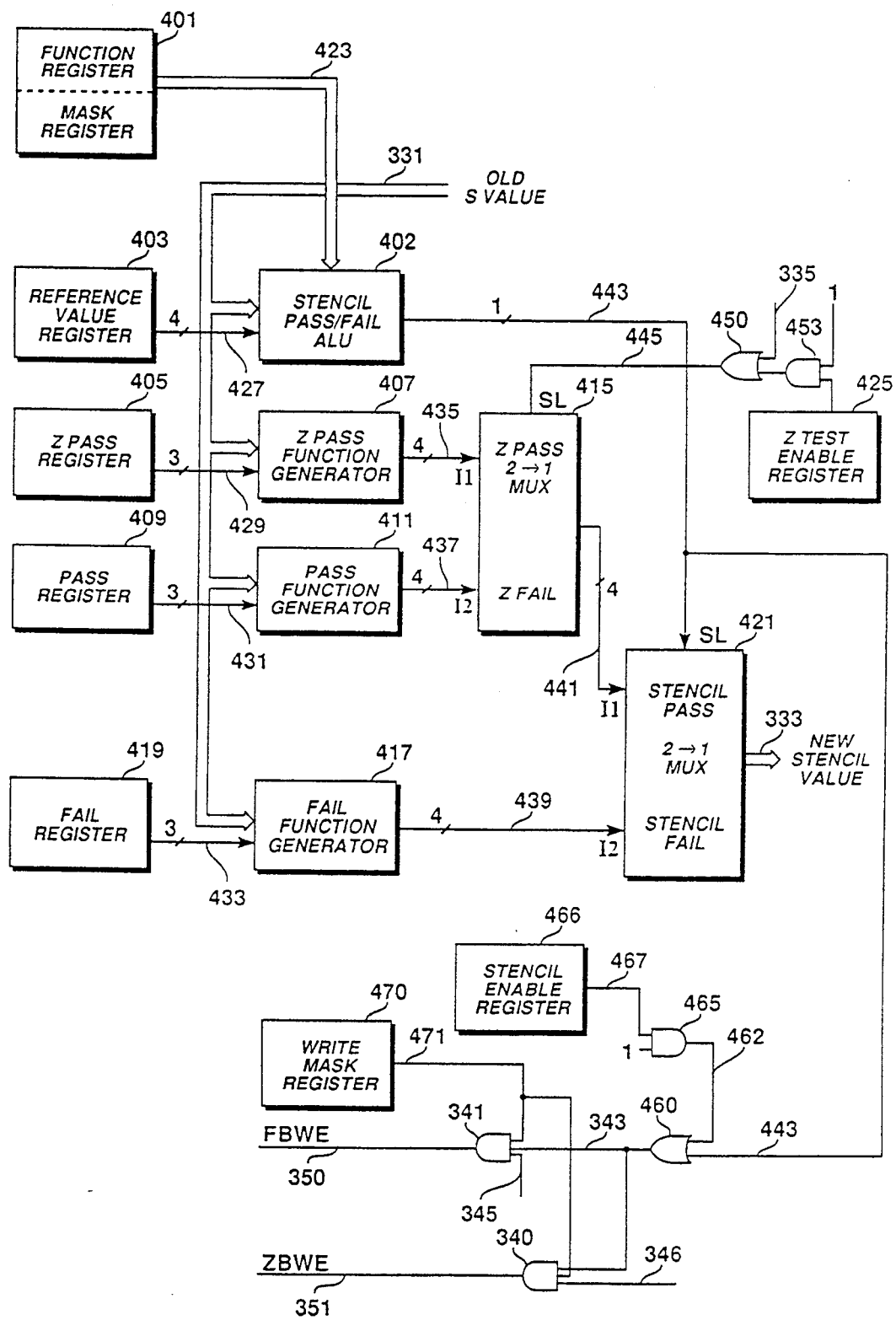
FIG. 2c is a schematic diagram of the preferred embodiment of the stencil logic of the present invention.

FIG. 2c shows in detail a particular embodiment for the stencil ALU and register 315 as well as the associated circuitry which includes the AND gates 340 and 341. The left side of FIG. 2c shows five registers which are controlled by the user to store and thereby specify a particular function or constant or flag, as the case may be, in order to control the operation of the stencil ALU. Function register and mask register 401 provides two storage locations for storing a value representing a particular stencil pass/fail function and a value representing a particular mask which will indicate to the stencil pass/fail ALU 402 which subset of the old stencil value to process. Specifically, the function register may receive values indicating a particular stencil pass/fail function such as one of the 8 stencil pass/fail functions identified above in TABLE 1 (e.g. SF_LESS). The mask register specifies which bits in the old S value to consider for purposes of evaluating the stencil pass/fail function specified by function register 401. Bus 423 couples the function register and the mask register to stencil pass/fail ALU 402. The old S value is supplied from the ALU 311 via bus 331 to the stencil pass/fail ALU 402 and to the three function generators 407, 411 and 417. The register 403 stores a reference value which is specified by the user, which reference value may be used by the stencil pass/fail function in conjunction with the old stencil value to determine the stencil pass/fail state of the current stencil location. The reference value from register 403 is supplied via bus 427 which is shown as a 4 bit bus. Thus, for example if the user stores a value indicating that the stencil pass/fail function will be "SF_LESS", then the stencil pass/fail ALU 402 will compare the old stencil value to the reference value stored in register 403 and will indicate a stencil pass state on line 443 if the reference value in register 403 is less than the old stencil value obtained from bus 331; conversely, if that stencil value is greater than the reference value then the fail state for the stencil state will be indicated on line 443 and no writing to the Z buffer or frame buffer will occur (leaving the old Z value and pixel value in the Z buffer and the frame buffer respectively).

Figure 6:
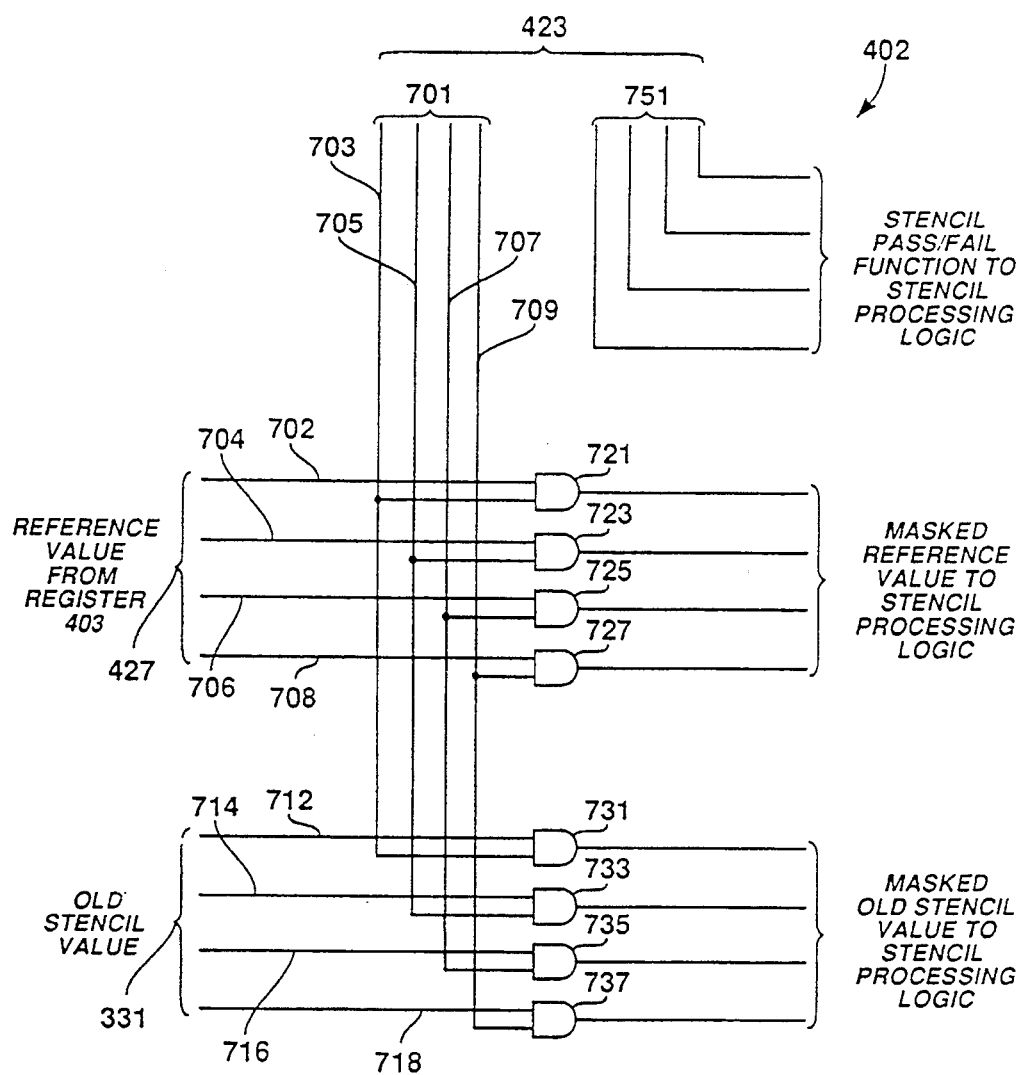
FIG. 6 shows an example of logic for providing the mask function from values stored in the mask register 401.

The mask register will indicate to the pass/fail ALU 402 which of the bits in the reference value and in the old stencil value to consider in evaluating the stencil pass/fail state. The mask affects both the reference value and the old stencil value in the same manner, and an example of logic to perform this is shown in FIG. 6. This example assumes that the reference, old stencil and mask values are each 4 bits. The bus 423 includes both the mask value (on bus 701 which has lines 703, 705, 707 and 709) and the bus 751 which carries the stencil pass/fail function specified by the function register 401. The 4 lines from the register 403 (in bus 427) are inputs to AND gates 721,723, 725 and 727, and the other inputs to these gates are the 4 lines of the mask bus 701. Similarly, the 4 lines from the bus 331 (providing the old stencil value) are inputs to AND gates 731,733,735 and 737, and the other inputs to these gates (731,733,735, and 737) are also the 4 lines of the mask bus 701. The output of the AND gates 721,723, 725 and 727 will provide the masked reference value to the stencil processing logic, and the outputs of AND gates 731,733, 735 and 737 will provide the masked old stencil value to the stencil processing logic. It will be appreciated that the stencil processing logic operates on the masked values (old S and References) rather than the unmasked values. It will also be appreciated that masking is selective; for example a logical "0" on line 703 of mask bus 701 will produce a logical "0" at the outputs of gates 721 and 731 regardless of the input on line 702 for the reference bit and regardless of the value of the old stencil bit on line 71 2, but the other reference bits and old stencil bits are left unmasked as long as lines 705, 707 and 709 remain a logical "1." Typically, bits of the same significance (e.g. most significant bit) are matched up (e.g. 702 and 712 may be the most significant bit of the reference and old stencil values respectively). This allows the stencil bit-planes to be allocated into "fields" so that one field can provide one function which is used during some operations and another field can provide another function during other operations. Thus, the mask register value limits the comparison performed according to the stencil pass/fail function to a subset of the bits in both the old stencil value and the reference value stored in register 403.

The new stencil value which will be stored to the stencil buffer via bus 333 is determined by one of the three function generators 407, 411 and 417, which one is selected on the basis of the select lines 445 and 443 which are coupled to the multiplexors 415 and 421 respectively. The three function generators 407, 411 and 41 7 calculate the new stencil value for the three different cases which are possible with the stencil test and the Z test. These three cases are as follows:

TABLE 3

1. Stencil test fails (result of the Z test does not matter). ("Fail")
2. Stencil test passes but Z test fails. ("Pass")
3. Stencil test passes and the Z buffer test passes. ("Z Pass")

In case number 1 (stencil test fails), the new value of the stencil will be specified by the fail function generator 417 which provides the new stencil value over bus 439 to the 12 input of the two to one multiplexor 421. The select line input of this multiplexor is coupled to the line 443 to receive the indication of the stencil pass/fail state; in the stencil fail state, the 12 input is selected and the new stencil value results from the computation performed by the fail function generator 417. It can be seen that in this case the result of the Z comparison test (which is provided via line 335 through "OR" gate 450 and line 445 to the multiplexor 41 5) does not matter.

If the case number 2 occurs (stencil test passes but the Z test fails) then the pass function generator 411 will have its output on bus 437 selected by multiplexor 41 5 and that output will be conveyed over bus 441 through multiplexor 421 to the stencil buffer via bus 333. If the third case exists (stencil test passes and the Z test also passes) then the output of the Z pass function generator 407 will provide the new stencil value through bus 435 which is selected as the input to mux 415, which conveys the stencil value through line 441 and the multiplexor 421 to the bus 333.

The registers 405,409 and 419 each receives a user specified flag which specifies the function which will be executed by the particular function generator which is coupled to the particular register. For example, the Z pass register 405, which is coupled to the Z pass function generator 407 through bus 429, stores a flag which specifies the particular function executed by the function generator 407. The function generators 407, 411 and 41 7 may be a simple ALU or other logic units which provide the simple functions such as incrementing the stencil value by one or decrementing the old stencil value by one. The user specifies, for each of the registers 405,409 and 419, one of the particular functions listed in TABLE 2 above.

It will be appreciated that the Z pass function generator 407 generates a new stencil value should the Z pass case occur, and at the same time the pass function generator 411 will generate the new stencil value which will be stored if the pass case results, and at the same time the fail function generator 41 7 will produce a new stencil value which will be stored should the fail case occur. These three potentially different new stencil values will be selected between by the two multiplexors 415 and 421, each of which is a two to one multiplexor as shown in FIG. 2c.

Multiplexor 415 has two-inputs, I1 and I2; input I1 is connected to receive the new stencil value produced by the Z function generator 407, and this new stencil value (in the case of the Z pass) will be the output of the multiplexor 415 if the Z pass condition occurs, which is indicated by line 445 which is connected to the select line of multiplexor 415. In the embodiment shown in FIG. 2c, line 445 selects the Z pass input when line 445 is a logical zero; this of course occurs when the new Z value is closer to the user's view than the old Z value. The Z fail input (I2) of multiplexor 415 is selected for output if the Z comparison failed (line 335 is logical one) or if the Z test is disabled by storing a logical one in the Z test enable register 425 which is coupled as an input to the AND gate 453. It will be appreciated that the Z buffer test is enabled when a zero is stored in register 425 causing the OR gate 450 to merely transmit the binary value on line 335 which indicates the result of the Z comparison. Thus, if the Z test is disabled (by storing a one in register 425) the new stencil value produced by the pass function generator 411 will always be the output of multiplexor 415 because the Z fail input (input I2) of multiplexor 415 will always be selected as the output. When the Z test is enabled the result of the Z test selects between input I1 and I2 of multiplexor 415.

Multiplexor 421 selects between the output of multiplexor 415 and the output of the fail function generator 417 according to the value indicated on line 443, which value represents the pass or fail state of the stencil test. The pass or fail state of the stencil test will also determine whether or not storing (writing) will occur to the frame buffer and the Z buffer at the currently processed pixel location. This can be seen by examining the interaction of OR gate 460 with AND gate 465 and AND gates 340 and 341. If the stencil test is enabled (by storing a zero) in the stencil enable register 466, then the OR gate 460 will transmit the stencil pass or stencil fail signal from line 443 to the inputs of AND gates 340 and 341. If the stencil test is disabled (by storing a one in register 466) then the result of the stencil test will not effect the storing of display information in the frame buffer. One of the three inputs to AND gate 341 is a register 470 into which is stored a one or a zero to indicate whether or not writing to the frame buffer should be masked (i.e. prevented); if a zero is stored in this register, then no writing to the frame buffer can occur. Similarly, one of the three inputs to AND gate 340 is the register 470; if a zero is stored in that register, writing to the Z buffer will be prevented. The use of this register will become clear below when an application of the method and device of the present invention is described. It can been seen that one of the inputs to AND gate 341 is line 345 which is received from the ALU and control unit 311; this line is the conventional write enable control line for the frame buffer. Similarly, line 346 is an input to AND gate 340, and line 346 is a conventional write enable control line for the Z buffer from the ALU and control unit 311.

An embodiment of the method of the present invention will now be described by referring to FIG. 3. It is assumed that the user has specified and thereby stored the stencil pass/fail function into the function register 401 and has also stored the mask value, if any, into the mask register 401. Similarly, it is also assumed that the user has specified the reference value for register 403, and the three registers 405,409 and 491 have each received a particular value indicating the function to be performed by its associated function generator. The method begins at step 501 where the function and mask registers are read. Contemporaneously, the reference value is read from register 403 in step 502 and the registers 405,409 and 419 are read in step 503. It will be understood that these steps may happen automatically and that no affirmative action need be taken by the ALU 402 or the function generators 407, 411 and 417, Next, the old S value is read in step 504 and this value is supplied to the ALU 402 as well as the function generators 407, 411 and 417. In step 505, the stencil pass/fail function is computed and this function may be dependent upon the old stencil value and the reference value, although it need not be dependent upon these values (e.g. "SF_NEVER"). The computation of this function determines whether the stencil test passed or failed. In step 506, the Z pass function is computed and this function may also depend upon the old stencil value. This function of course, will depend upon the value stored in the Z pass register. Similarly, in step 507 the pass function is calculated by the pass function generator 411 and this value may be dependent upon the old stencil value and will depend upon the pass flag stored in pass register 409. In step 508, the fail function will be computed by the fail function generator 417. It will be understood that steps 506, 507 and 508 may occur at the same time and may be computed sequentially in any order. Next, in step 509, it is determined whether or not the Z test is enabled. If the Z test is not enabled, processing proceeds to step 51 4 in which the new S value is determined by selecting between the pass and fail function generator outputs on the basis of whether the stencil test passed or failed. Processing then continues to step 513 from 514. If the Z test is enabled then processing proceeds from step 509 to 510, where the result of the Z test is determined and that is used in the next step, which is step 511. Step 511 involves a selection between ("b/n") the outputs of the Z pass function generator 407 and the pass function generator 411 on the basis of the Z test comparison. Next, in step 512, the new stencil value is determined by selecting between the value selected in the prior step 511 (Z pass stencil value or pass stencil value) and the fail stencil value which is generated by the fail function generator 417. This selection is determined by the result of the stencil pass/fail test. In step 513, the new stencil value is stored in the stencil buffer and processing proceeds to step 515 to determine whether or not to write the new pixel and Z value into the frame buffer and Z buffer respectively. If the stencil test failed then, in step 516, no writing occurs; if the stencil test passed then writing (storing) occurs in step 517 and the process proceeds to step 519 in which it waits for the next frame buffer writing instruction from the main CPU/host system if processing of all scan lines is completed, which is determined in step 518.

Figure 3:
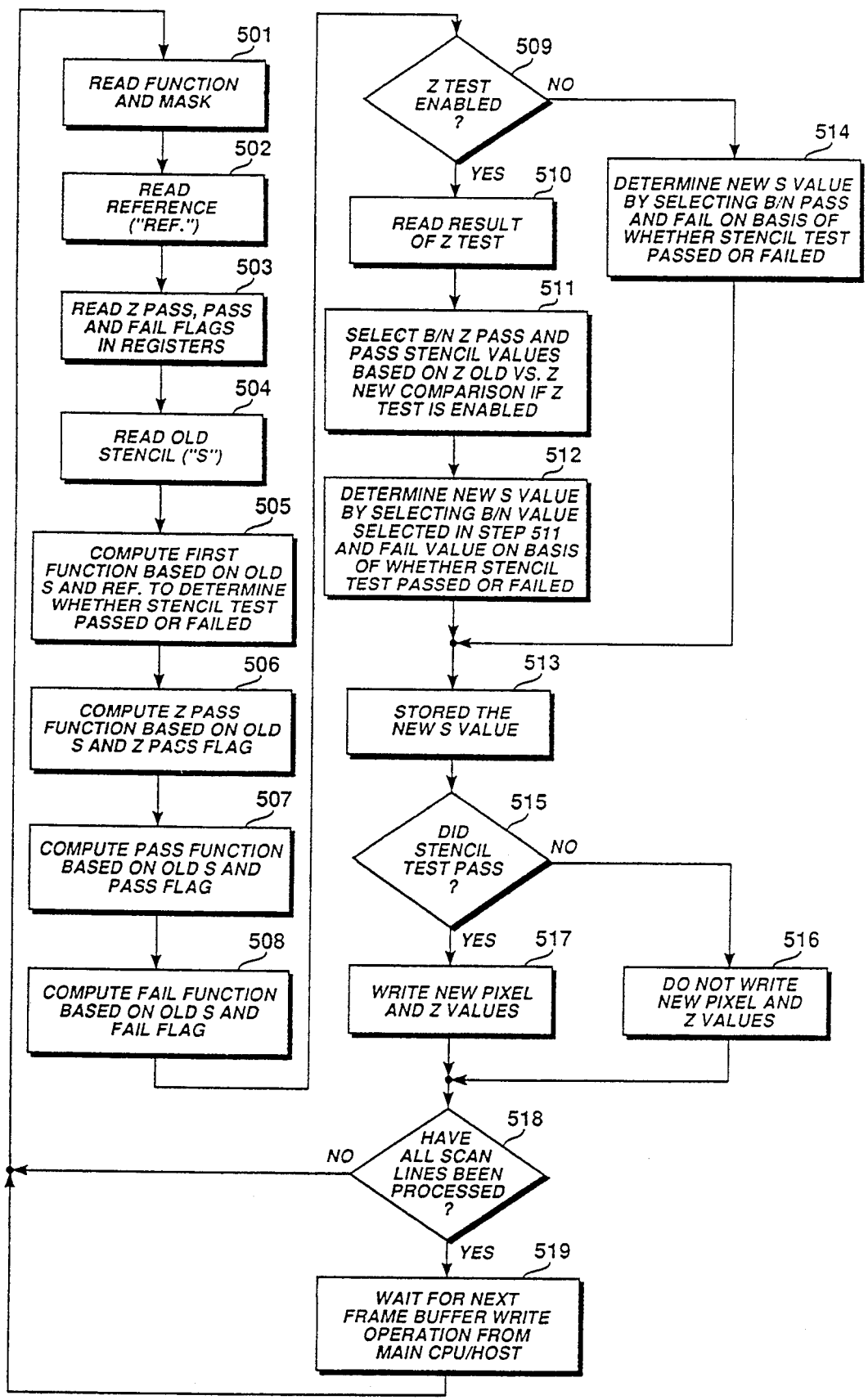
FIG. 3 is a flow chart depicting the method of the present invention.

It will be appreciated that the method described in conjunction with FIG. 3 may be used with the logic circuitry shown in FIG. 2c as well as with other circuit implementations of the present invention. Moreover, the method may be used in a general purpose computer which implements the method in software without any special purpose hardware.

Several applications of the present device and method will now be described. One trivial application is to use the stencil buffer as literally a stencil mask which would statically prevent certain pixels from being displayed on the display device by preventing writing to the frame buffer of display information. Another more interesting application involves writing to the frame buffer on every nth try. In other words, the stencil test is set up so that writing to a particular pixel location only occurs after n−1 attempts at writing that pixel location have occurred. If this method were applied iteratively and continuously, it would cause the pixel to flash.

Figure 4:
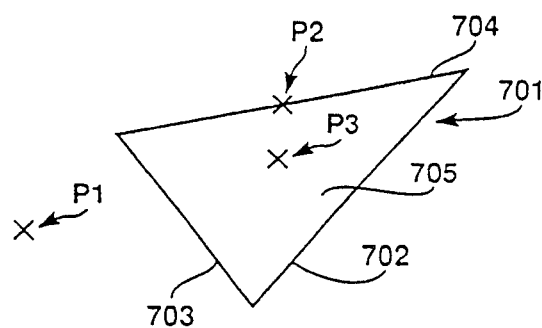
FIG. 4 shows an example of a hollow polygon.

Another application of the device and method of the present invention involves the generation of hollow polygons in a computer system which typically generates fill shaded polygons. FIG. 4 shows the hollow polygon 701 which has three borders or perimeters 702, 703 and 704, as well as an interior region 705. Those regions outside of the perimeters are referred to as exterior regions, and pixel P1 is a pixel in the exterior region. Pixel P3 is a pixel in the interior region 705 within the polygon. Pixel P2 is shown in FIG. 4 as being on the perimeter 704. When it is desired to display a hollow polygon, conventional computer systems must attempt to draw only those pixels which are on the polygon's perimeter. Outlining does not accomplish this ideal result because lines are not subpixel corrected (antialiasing) as polygons are. A better approach is to recognize only those pixels on the perimeter during the scan conversion operation which fills the polygon and change only these pixels. The device and method of the present invention allow this recognition to be accomplished easily for any polygon, including concave polygons.

Figure 5:
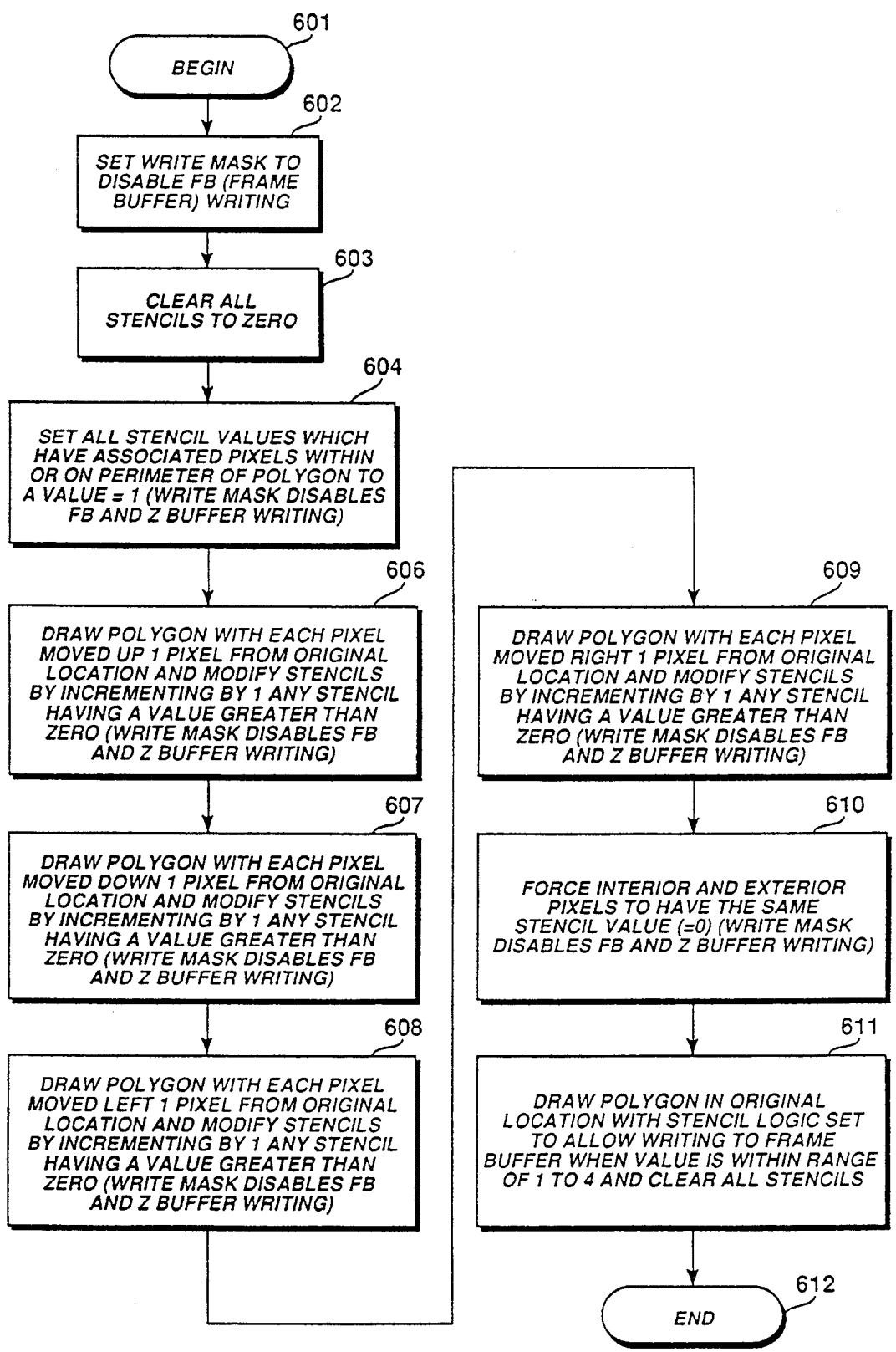
FIG. 5 shows a flow chart for the method of generating a hollow polygon according to the method and device of the invention.

The method of generating hollow polygons, as shown in FIG. 5, begins in step 602 wherein the writemask is set so as to disable writing to the frame buffer and Z buffer. This is done by storing the appropriate value into a writemask register or storage location (e.g. a logical zero into the writemask register 470 shown on FIG. 2c) in order to prevent writing of display information into both the frame buffer and Z buffer. Other means will be apparent to those in the art to disable writing to the frame and Z buffers. Next, in step 603, all of the stencils for every pixel location in the frame buffer are cleared to zero in order to initialize the system and to prepare for the generation of hollow polygons. Steps 602 and 603 may be implemented in psuedocode which is shown below.
Stencil (4)
Writemask (0)
Stencilmode (0,SF_ALWAYS,1111, ST_ZERO, ST_ZERO, ST_ZERO)
Clear Frame Buffer This first instruction, "stencil (4)", tells the system that the stencil function is enabled and that a 4 bit stencil value will be used. The instruction "writemask (0)" disables writing to the frame buffer. The instruction "stencil mode (0, SF_ALWAYS, 1111, ST_ZERO, ST_ZERO, ST_ZERO)" is an instruction to set the six registers shown in FIG. 2c. This instruction has six arguments which are in the form: stencilmode (reference value, stencil pass/fail test function, stencil mask, fail, pass, zpass). It can be seen that the first argument, the reference value will store a reference value into the reference register 403 and the second argument, stencil pass/fail test function, will store one of the eight possible functions which is specified in TABLE 1 above into the function register 401. The next argument "stencil mask" indicates which of the 4 bits of the stencil value to ignore; in the example presented here, no stencil bit value is ignored and thus the stencil mask value is always "1111" (see FIG. 6). The next three arguments specify the flags stored in the fail register 419, the pass register 409, and the Z register 405 respectively and these flags are indicated in TABLE 2. Finally, the "clear frame buffer" instruction causes every stencil value for every pixel location to be addressed so that the stencil method as shown in FIG. 3 may be executed for every pixel location in the frame buffer with the stencil mode set by the stencilmode instruction so that the stencil test always passes and that a zero is always stored as the new stencil value for every pixel location in the stencil buffer.

Next processing proceeds to step 604 in which all stencil values, which have associated visible pixels within or on the perimeter of the polygon, are set to a value equal to 1. In this step, the writemask continues to disable writing to the frame buffer. Sample psuedocode is presented below.
writemask (0)
stencilmask (1, SF_ALWAYS, 1111, ST_KEEP, ST_KEEP, ST_REPLACE)
draw polygon It should be noted that the Z buffer test is enabled, and that the polygon is "drawn" in the sense that each pixel location for the entire display device is being addressed by the graphics update controller, which is examining the Z value for each pixel location and the stencil value for each pixel location and is performing the stencil operation specified by the stencil mode command given immediately above. Of course, with the write mask disabling writing to the frame and Z buffers, no change will occur to the frame and Z buffers and hence no apparent change will appear on the screen of the display apparatus. It will be understood that in step 604 the method of FIG. 3 will be executed on the device of FIG. 2c for each pixel location so that all stencil values within the interior or on the perimeter of the polygon will be set to one.

The next four steps, 606, 607, 608 and 609 result in the determination of perimeter pixels; that is, these steps collectively cause the recognition of only perimeter pixels of the polygon so that only these, when drawing the polygon can be enabled for storage into the frame buffer. This is done by attempting to draw the main polygon four times, each time shifted from its original location one pixel to the left, one pixel to the right, one pixel up, and one pixel down; the order in which this shifting occurs does not matter. Each time that the polygon is attempted to be redrawn, all stencil values having a value greater than zero are incremented by one. It will be appreciated that following step 604, stencils for pixels which are on the exterior of the polygon have stencil values equal to zero and all stencils for pixels which are within the interior or on the perimeter of the polygon have a stencil value equal to one.

In step 606, graphics data is supplied to the update controller in order to attempt to draw the polygon (however the write mask disables frame buffer and Z buffer writing) but the polygon is drawn shifted one pixel up from its original location; during the drawing operation, which is an attempt to update the complete frame buffer, the stencil values are incremented by one for any stencil having a value greater than zero. Steps 607, 608 and 609 repeat the actions of step 606 except that the polygon is shifted one pixel down in the case of step 607, and one pixel to the left from the original location in the case of step 608 and the polygon is drawn in a position which is shifted one pixel to the right from the original location of the polygon in step 609. In each case, the frame and Z buffers will not be updated as the write mask disables writing/storing to the frame and Z buffers but the stencil values will be modified as an attempt is made to write to each pixel location in the frame buffer; it will again be appreciated that in each of these four steps 606, 607, 608 and 609 the method of FIG. 3 will be executed for each and every location in the frame buffer in the interior of or upon the perimeter of the shifted polygon; i.e. all drawing occurs only in the interior of or the perimeter of the polygon. The order in which these four steps are performed is not important and any order will work. A psuedocode implementation of steps 606, 607, 608 and 609 is shown below.

writemask (0)
stencilmode (0, SF_LESS, 1111, ST_ZERO, ST_KEEP, ST_INCR)
shift polygon left 1 pixel
draw polygon
shift polygon right 1 pixel
draw polygon
shift polygon up 1 pixel
draw polygon
shift polygon down 1 pixel
draw polygon In step 610, which is next, the method forces interior and exterior pixels to have the same stencil value, in this case a value of zero, while the write mask continues to disable writing to the frame and Z buffers. It should again be appreciated that in step 610, the method of FIG. 3 is performed once for each pixel location in the frame buffer and this method may be performed on the logic circuitry shown in FIG. 2c or on other equivalent implementations. A psuedocode example is presented below for performing step 610.

writemask (0)
stencilmode (5, SF_EQUAL, 1111, ST_KEEP, ST_KEEP, ST_ZERO)
draw polygon Step 611 performs the final result in that the hollow polygon is now drawn into the frame buffer by enabling writing into the frame buffer (the write mask is set to allow storing of display information into the frame buffer). When the polygon is drawn by supplying the graphics data necessary to generate the polygon, such as a scan line by scan line collection of pixel data, the polygon will be drawn with the stencil logic set to allow writing of the polygon only on its perimeter. The stencils values for all pixel locations will be cleared to zero in step 611 so that further operations can continue. Step 611 is based upon the fact that after step 609, all perimeters pixels will have stencil values between 1 and 4 while interior pixels will have stencil values equal to 5 and exterior pixels will have stencil values equal to zero. After step 610, all interior and exterior pixels not on the perimeter of the polygon will have stencil values equal to zero. Thus, by simply testing whether the stencil value for a particular pixel is within a certain range it can be determined whether or not the pixel is on the perimeter of the polygon and therefore drawn or not drawn. A psuedocode implementation of step 611 is presented below.

writemask (1)
stencilmode (0, SF_LESS, 1111, ST_ZERO, ST_ZERO, ST_ZERO)
draw polygon The foregoing invention has been described with reference to certain specific details, logic circuits and processing steps which were presented for a thorough understanding of the invention. It will be appreciated that numerous modifications and applications may be made of the present invention without departing from the spirit and scope of the claims which follow.

We claim:

1. In a computer controlled graphics display system having a display device and a frame buffer for storing digital display information, said frame buffer having a first plurality of locations each corresponding to and mapped to a pixel on said display device, a method for controlling the storage of display information in said frame buffer, said method comprising:
   obtaining a first value from a first memory, said first memory having a plurality of locations each corresponding to one of the locations in said first plurality of locations;
   selecting a first function;
   providing a first signal based upon said first function and said first value;
   selecting a second function;
   determining a second value from said second function and said first value;
   selecting a third function;
   determining a third value from said third function and said first value;
   selecting between said second value and said third value according to said first signal;
   storing said selected value in said first memory; and
   determining whether to store information for the pixel location corresponding to said first value in said frame buffer based upon said first signal.

2. A method as in claim 1, further providing a first reference value.

3. A method as in claim 2, further providing a mask value to specify a subset of both said first value and said first reference value to be evaluated by said first function.

4. A method as in claim 2, wherein said first function compares said first value to said first reference value to provide said first signal.

5. A method as in claim 4, wherein said first function may be any one of the following functions: (a) indicate a first state if said first reference value is less than said first value; (b) indicate said first state if said first reference value is less than or equal to said first value; (c) indicate said first state if said first reference value is equal to said first value; (d) indicate said first state if said first reference value is greater than said first value; (e) indicate said first state if said first reference value is greater than or equal to said first value.

6. A method as in claim 1, wherein said second function varies said first value to provide said second value.

7. A method as in claim 2, wherein said first function provides said first reference value as said first signal.

8. A method as in claim 6, wherein said second function is one of the following functions: (a) incrementing said first value by one; (b) decrementing said first value by one.

9. A method as in claim 1, wherein said third function varies said first value to provide said third value.

10. A method as in claim 1, wherein said first function provides the value of zero as said first signal.

11. A method as in claim 9, wherein said third function is one of the following functions: (a) incrementing said first value by one; (b) decrementing said first value by one.

12. A method as in claim 1, wherein said second value is selected when said first signal indicates a first state, and wherein said third value is selected when said first signal indicates a second state.

13. A method as in claim 1, wherein said method is repeated for each location in said first memory.

14. A method as in claim 1, further providing a fourth function wherein said fourth function provides a fourth value which is determined by said first value and by said fourth function.

15. A method as in claim 14, wherein said fourth value and said second value are selected between such that, when said fourth value is selected, it is substituted for said second value in said step of selecting between said second value and said third value.

* * * * *